Feb. 7, 1928.

R. G. FORDYCE 1,658,765

MACHINE FOR DEPOSITION OF COATING

Filed Aug. 17, 1926

Inventor
Rufus G. Fordyce,
By Royal E. Burnham,
Attorney

Feb. 7, 1928.

R. G. FORDYCE 1,658,765

MACHINE FOR DEPOSITION OF COATING

Filed Aug. 17, 1926    4 Sheets-Sheet 2

Inventor
Rufus G. Fordyce,
By Royal E. Burnham
Attorney

Feb. 7, 1928.

R. G. FORDYCE 1,658,765

MACHINE FOR DEPOSITION OF COATING

Filed Aug. 17, 1926  4 Sheets-Sheet 3

Inventor
Rufus G. Fordyce,
By Royal E. Burnham,
Attorney

Feb. 7, 1928.

R. G. FORDYCE 1,658,765

MACHINE FOR DEPOSITION OF COATING

Filed Aug. 17, 1926　　4 Sheets-Sheet 4

Inventor
Rufus G. Fordyce,
By Royal E. Burnham,
Attorney

Patented Feb. 7, 1928.

1,658,765

UNITED STATES PATENT OFFICE.

RUFUS G. FORDYCE, OF CHICAGO, ILLINOIS.

MACHINE FOR DEPOSITION OF COATING.

Application filed August 17, 1926. Serial No. 129,776.

This invention relates to machines for deposition, stamping, or embossing of liquid and semi-liquid coating material on surfaces in the form of letters, numerals, other characters, ornamental configurations, etc., under the influence of either gravity or air pressure.

It is an object of the invention to provide a machine that not only will function satisfactorily with comparatively light or thin liquid coatings such as can be conveyed to places of deposition under the influence of air blasts and currents, but also with heavier, thicker, or more viscous coatings in liquid or semi-liquid state.

Another object of the invention is to provide a machine that includes a container of coating having a stencil or die at its bottom and a device controlling emission of coating through the stencil or die, and means whereby stock to be treated may be brought into contact with or proximity to the stencil.

The invention also provides a stirrer mechanism for the container, means for positioning accurately pieces of stock with respect to the stencil, and other details of novel character, as hereinafter set forth.

When considered with the description herein, the characteristics of the invention are apparent from the accompanying drawings, forming part hereof, wherein there is disclosed, for purposes of illustration, an adaptation of the invention to a hand-controlled machine for deposition of luminous compound in the shape of numerals and other markings on dial elements of timepieces.

Although the disclosures herein are exemplifications of what are considered preferable adaptations to a machine of that kind, it is to be understood that it is not the intention to be limited necessarily thereto in in terpretation of the claims, as modifications in the disclosed machine and other adaptations, within the limits of the claims, can be made without departing from the nature of the invention.

Like reference-characters refer to corresponding parts in the views of the drawings, of which—

Figure 1:
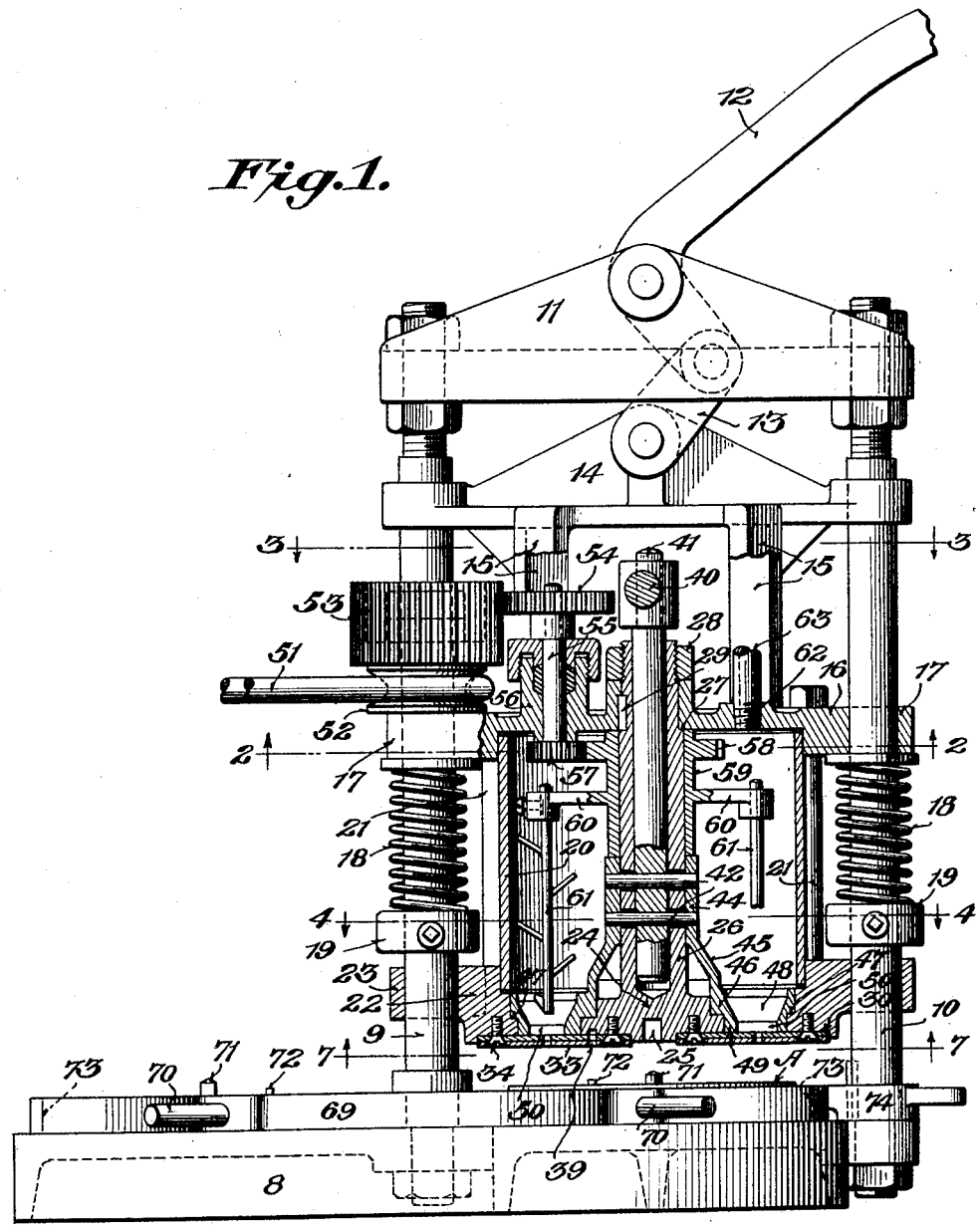
Fig. 1 is an elevation, the tank and certain associated parts being shown in section.
Figure 2:
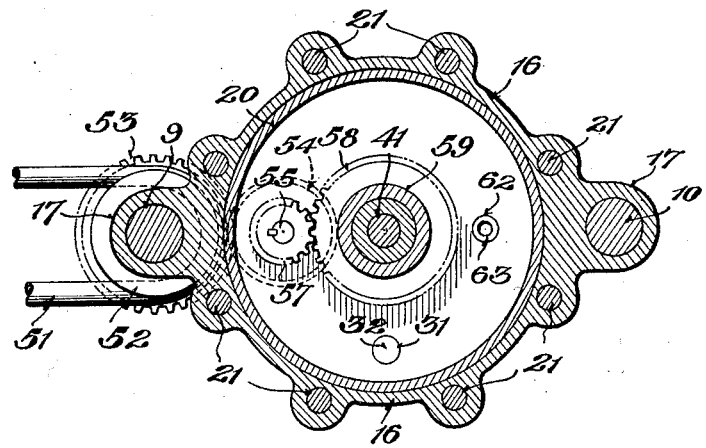
Fig. 2 is a section on the line 2—2, Fig. 1.
Figure 3:
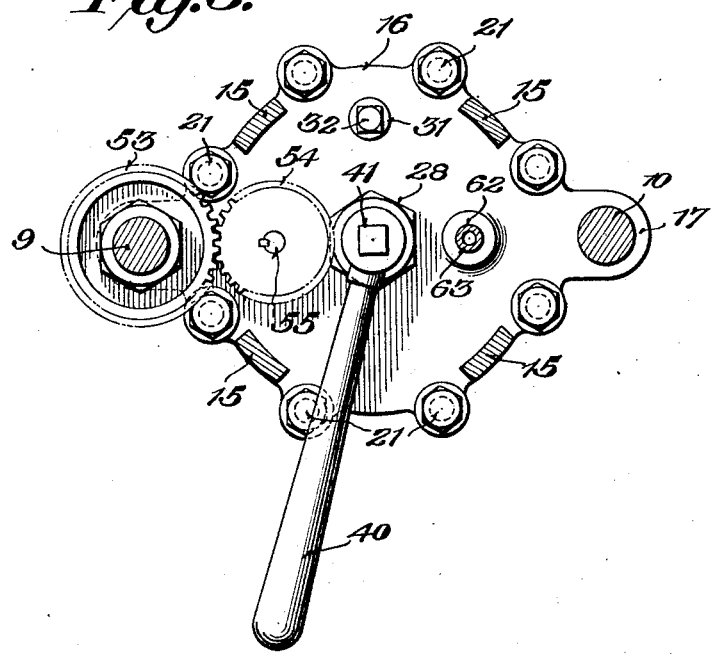
Fig. 3 is a section on the line 3—3, Fig. 1.
Figure 4:
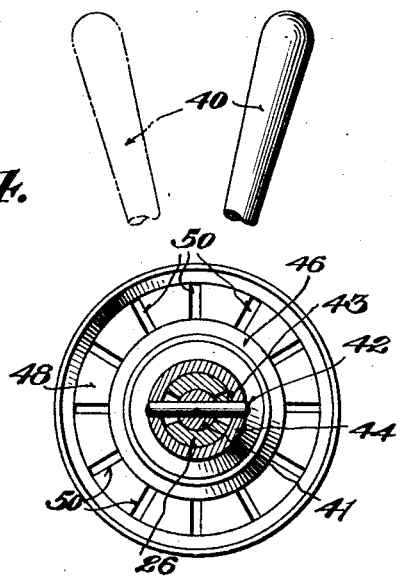
Fig. 4 is a section on the line 4—4, Fig. 1.

Base and frame parts.

The machine includes a base 8 arranged to rest on a bench, table, or other suitable support, two standards 9 and 10, preferably in the form of rods or shafts, secured to and extending upwardly from the center and side of the base, respectively, and a crosspiece 11 secured on the upper portions of the standards.

A lever 12 fulcrumed on the member 11 is connected by a link 13 with a cross member 14 slidable on the standards. The cross member 14 is connected by members 15 depending therefrom with a member 16 of disk-like form having laterally-extending lugs 17 through which the standards are disposed and by which the member 16 is guided in its vertical movement. The members 14, 15, and 16 preferably are of integral formation. Springs 18 on the standards are interposed between the lugs 17 and adjustable abutments 19 therebelow on the standards.

Tank structure.

The member 16 is the cover of the tank for containing coating. A cylindrical member 20, preferably of seamless tubing, constituting the side wall of the tank, is clamped in fluid-tight contact at its upper and lower ends by bolts or machine-screws 21 between the cover and an annular member 22, which latter has laterally-extending lugs 23 through which the standards 9 and 10 are disposed and by which the member is guided in its vertical movement.

The central portion of the bottom of the tank is afforded by an enlarged foot 24, having a central recess 25 opening to its bottom. The foot is the base of, and closes, a hollow column or shaft 26. The column has on its upper portion an annular exterior abutment 27, which is held against the under side of the cover by a nut 28 on the upper end of the column. The column thus is suspended from the cover. It is held against rotation by a key 29.

The under surfaces of the member 22 and the foot 24 are in substantially the same plane, an annular opening is between that member and foot, and they are formed with an annular seat 30 in the bottom.

The cover has an opening 31, closed by a plug 32, through which coating may be charged into the tank.

Stencil or die.

An annular stencil or die plate 33, which hereinafter is referred to as the stencil, is held fixed in the seat 30 by removable fastenings 34, and it spans the space between the member 22 and foot 24. It has openings 35 therethrough of the shape and disposition of the configurations it is desired to form on pieces of stock. In the present exemplification, those openings are of the shape and disposition of numerals to be formed on dials of timepieces.

Figure 6:
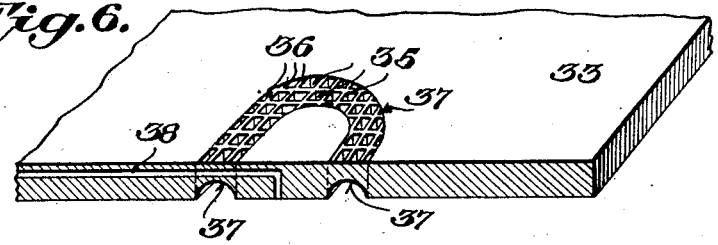
Fig. 6 is a fragmentary view of the stencil in section and perspective.
Figure 7:
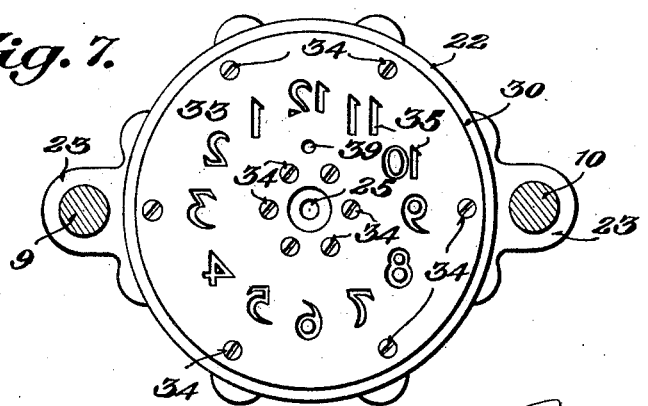
Fig. 7 is a bottom view of the stencil.
Figure 5:
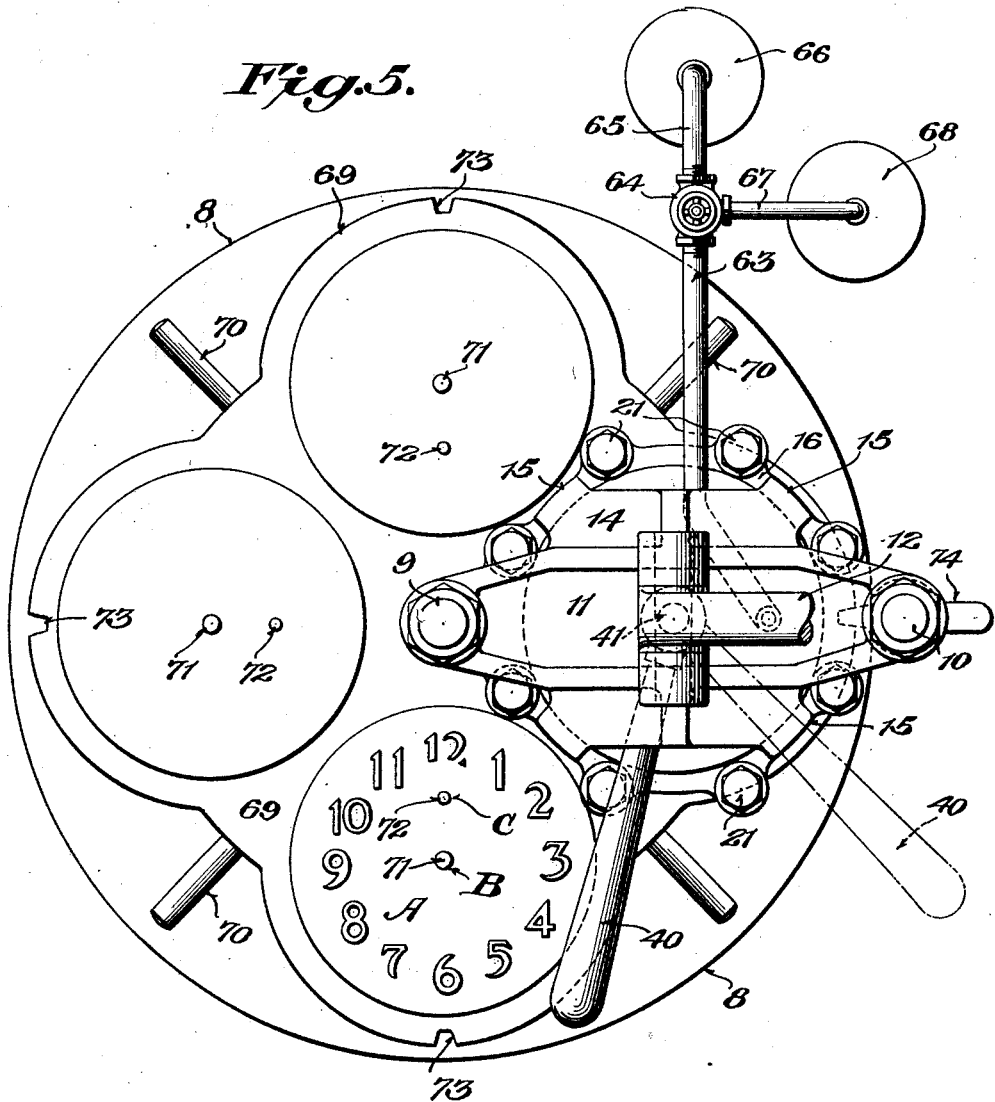
Fig. 5 is a plan view.

In order to limit to a certain extent the amount of coating extruded through the stencil, and also to support parts of the stencil in such characters as "4", "6", "8", "9", and "0", a lattice-like structure 36 of the stencil material extends through the openings, as seen in Fig. 6. The lattice is in the upper portions of the openings only, as shown, and it does not extend to the bottom of the stencil. Thus it does not interfere with the deposition of continuous characters. The lattice is formed of a plurality of intersecting bridges 37 disposed across the openings in two or more directions.

In order to facilitate release of stock from the bottom surface of the stencil, the latter may be formed with air passages 38, such as shown in Fig. 6 as leading upwardly from the under surface of the central part of the "0" and thence transversely through a bridge to a side edge of the stencil, where it is open to the atmosphere. Passages of this sort permit the easy release of stock from the stencil by preventing occurrence of partial vacuums therebetween.

The stencil has a recess 39, which opens to its bottom, and which also may extend into the foot, and it has eccentric disposition with respect to the central recess 25 of the foot.

Shutter device.

A handle 40 extends laterally from the upper portion of a shaft 41 in the hollow column 26. Pins 42 in the lower portion of that shaft extend through circumferential slots 43 in the column into a sleeve 44 on the outside of the column. The sleeve is the hub of an integrally-formed spider-like structure that includes also an enlarged depending portion 45 and an outwardly-flaring lower ring-like part 46 resting on annular seats 47 on the inside of the annular member 22 and the foot 24. The part 46 has a continuous annular channel 48, and it also has a base portion 49 contacting with the top of the stencil. It closes the tank at its bottom between the member 22 and the foot 24, except for openings 50 extending downwardly from the channel 48 through the base portion. Those openings have disposition corresponding with those of the stencil.

Stirrer mechanism.

Driven by any suitable mechanism, as by a belt 51 on a pulley 52 rotatably mounted on the upright 9, a gear 53 on that upright meshes with a gear 54 on the upper end portion of a shaft 55 journaled in a stuffing-box 56 of the cover near its side. This shaft extends downwardly through the cover, and on its inner end there is mounted a pinion 57, which meshes with a gear 58 of a sleeve 59 rotatable on the column 26. The sleeve has radially-extending arms 60, which carry downwardly-depending stirrers 61, which extend into the channel 48 of the shutter part 46.

Fluid-pressure-varying means.

The cover has a nipple 62 communicating with the interior of the tank, and it is coupled with a flexible tube 63 in communication with means for varying fluid pressure in the tank.

A valve 64 associated with the outer end of the tube 62 is arranged to control communication between the coating-tank and a pipe 65 connected with any suitable suction device such as a vacuum-tank 66 and a pipe 67 connected with any suitable source of air under pressure above atmospheric such as a pressure-tank 68.

Stock-carrying table.

Stock may be positioned in any suitable manner to be acted on by the stencil.

As an example of a practicable means for that purpose, the machine exemplified herein is shown as including on its base a rotatable table 69, which is journaled at its center on the standard 9, and which has radially-extending handles 70 for turning.

The table has a series of upwardly-projecting pins 71 for engagement in center holes B that have been made in pieces of timepiece-dial stock A for accommodation of hour and minute hand arbors and another series of similar pins 72 for engagement in holes C made in the stock for accommodation of second-hand or alarm-hand arbors. Each series of pins is concentric with the axis of the table, and the pins are positioned in such manner that they may protrude into the recesses 25 and 39 of the tank structure.

For the purpose of holding the table against rotation, it has marginal seats 73, which are engageable by a latch 74 on the standard 10. The seats have such disposition that, when one of them is engaged by the latch, a pair of pins 71 and 72 are aligned with the recesses 25 and 39, and a piece of dial-stock into which the pins extend is in proper position for action of the stencil thereon.

*Operation.*

The tank is partially filled with liquid or semi-liquid coating, which continuously is agitated by the stirrer mechanism. Normally the bottom of the tank is closed by maintenance of the shutter with its openings out of registry with the openings of the stencil.

When it is desired to stencil, stamp, or emboss a piece of stock on the table under the stencil, the tank structure, which normally is held in its upper position away from the table by the springs 18, is forced downwardly by the lever 12, the stencil is brought against the stock, the shaft 41 is turned by the handle 40 to bring the openings 50 of the shutter into alignment with the openings of the stencil and thus permit coating to pass through the stencil onto the stock, the shutter at once is turned in the reverse direction to bring its openings to closing position out of alignment with those of the stencil, and the tank structure, and thus the stencil thereon, is raised by movement of the lever. Thereupon, the table may be turned to bring another piece of stock into position to be treated, it being understood, of course, that, as the table is turned, treated pieces of stock are removed and untreated pieces substituted therefor. The circumferential slots 43 in the column are of such length that, when the pins 42 are against one end thereof, the openings or ports 50 of the shutter are out of alignment with the openings of the stencil, and that, when they are against the other ends of the slots, the ports are in alignment with the stencil-openings. By this coordination of the parts, the shutter is prevented from being brought during closing movement to such position as to register its ports with the stencil-openings. The gear 53 on the standard 9 is sufficiently long to permit the gear 54 to retain mesh therewith during vertical movement of the tank structure.

If the coating being used is of comparatively light or thin consistency, sufficient quantities thereof may flow under the influence of gravity alone through the stencil onto the stock. However, sometimes with comparatively light or thin coating, and ordinarily with that of heavier or more viscous consistency, it is necessary to effect its extrusion through the stencil under the influence of fluid pressure. In such circumstances, and while the stencil is in contact with the stock, the valve 64 is operated momentarily to afford communication between the coating-tank and the pressure-tank 68. The amount of pressure thus created in the coating-tank is regulated in accordance with the character of the coating being used, the amount of coating it is desired to deposit, and other factors pertaining to the situation.

In bringing the stock into contact with the stencil, sometimes sufficient air is in the stencil-openings, between the stock and the coating, to set up a resistance to entrance of the coating into those openings. This condition is met particularly when the stock is held in sufficiently close contact with the stencil to make it not only liquid tight, but also air tight. In this event, the air resistance in the stencil openings is removed by creating a partial vacuum in the coating-tank, while the shutter is out of alignment with the stencil-openings. This exhausts air from the coating-tank, both over and under the coating therein, and from the openings of the stencil. The vacuum then is released, and, when air enters the coating-tank, over the coating therein, the stencil-openings are filled with coating, either by suction or gravity; and, if necessary with coating of certain consistencies, air pressure is applied to the coating-tank.

When the coating is of a suitable consistency, it is necessary to bring the stock into contact with the stencil only with sufficient pressure to make it liquid tight, but not air tight, so that the air in the stencil openings between the coating and the stock can escape between the stencil and stock.

What I claim as new, and desire to secure by Letters Patent, is—

1. In a stenciling-machine, a coating-container, a stencil thereon, a member controlling passage of coating between said container and said stencil, means whereby fluid pressure in said container is varied, and means whereby stock and said stencil are brought into contact.

2. In a stenciling-machine, a stock-carrier, a coating-container movable toward and away from said carrier, a stencil on said container opposite to said carrier, a member controlling passage of coating between said container and said stencil, means whereby fluid pressure in said container is varied, and means whereby said container is reciprocated.

3. A stenciling-machine comprising fixed standards, a coating-container slidable on said standards, a stencil on said container in communication with the interior thereof, and means whereby said container is moved and said stencil contacted with stock.

4. In a stenciling-machine, fixed standards, a coating-container comprising end members slidable on said standards, a stencil on one of said end members in communication with the interior of said container, and means whereby said container is moved and said stencil contacted with stock.

5. In a stenciling-machine, fixed standards, a coating-container comprising end members slidable on said standards and a side wall therebetween, a stencil on one of said end members in communication with the interior of said container, and means whereby said container is moved and said stencil contacted with stock.

6. In a stenciling-machine, a coating-container comprising a cover member and a ring-like lower member and a side wall therebetween, a column suspended from said cover having a foot inside of said lower member and spaced therefrom, and a stencil spanning the space between said foot and lower member.

7. In a stenciling-machine, a coating-container comprising a cover and a ring-like lower member and a side wall therebetween, a column suspended from said cover having a foot inside of said lower member and spaced therefrom, a stencil spanning the space between said foot and lower member, and a control-shutter above said stencil turnable on said column.

8. In a stenciling-machine, a coating-container comprising end members and a side wall therebetween and a central column, a sleeve rotatable on said column, stirrers on said sleeve, and drive means for said sleeve mounted on one of said end members.

9. In a stenciling-machine, a coating-container, a pipe communicating with the upper part of the interior thereof and connected with a fluid-pressure-varying device, a control-valve for said pipe, a stencil at the bottom of said container in communication with the interior thereof, and a member controlling passage of coating between said container and said stencil.

10. In a stenciling-machine, a coating-container, a pipe communicating with the upper part of the interior thereof, a valve device connected with said pipe, an air-suction device, an air-pressure device, pipes connecting said suction and pressure device with said valve device, a stencil at the bottom of said container in communication with the interior thereof, and a member controlling passage of coating between said container and said stencil.

11. In a stenciling-machine, the combination of a coating-container, a stencil in communication therewith, a member controlling passage of coating between said container and stencil, a stirrer in said container, and means whereby fluid pressure in said container is varied.

12. In a stenciling-machine, a coating-container, a stencil thereon, means whereby flow of coating from said container to said stencil is shut off, and means whereby stock and said stencil are brought into contact.

13. A plate, for holding coating for deposition therefrom, having extending therethrough continuous openings of substantially the shape of configurations to be made by deposited coating, and a lattice structure in and extending across said openings.

14. A plate, for holding coating for deposition therefrom, having extending therethrough continuous openings of substantially the shape of configurations to be made by deposited coating, and a lattice structure in and extending across said openings and spaced from one surface of said plate.

15. A plate, for holding coating for deposition therefrom, having extending therethrough continuous openings of substantially the shape of configurations to be made by deposited coating, and a plurality of intersecting bridges in and extending across said openings.

16. In a stenciling-machine, a coating-container, a stencil thereon, a movable member adjacent to said stencil controlling passage of coating material from said container, and means whereby stock and said stencil are brought into contact.

17. In a stenciling-machine, a coating-container, a stencil thereon, a member turnable at one side of said stencil controlling passage of coating material thereto, and means whereby the other side of said stencil and stock are brought into contact.

In testimony whereof I affix my signature.

RUFUS G. FORDYCE.